Oct. 29, 1935.  A. B. CLARK  2,019,174
SPEED CHANGE GEARING DEVICE
Filed Feb. 14, 1934  5 Sheets-Sheet 2
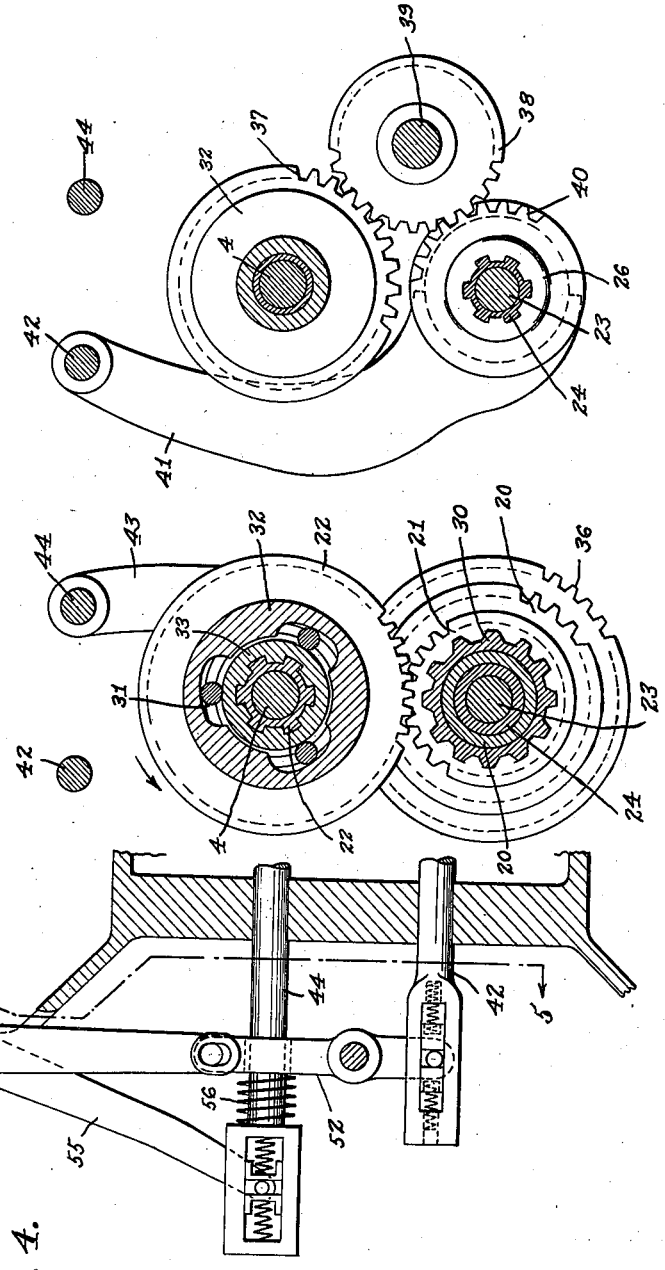
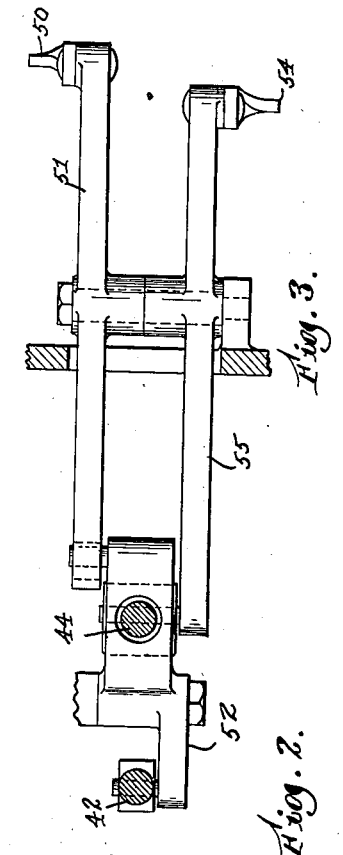
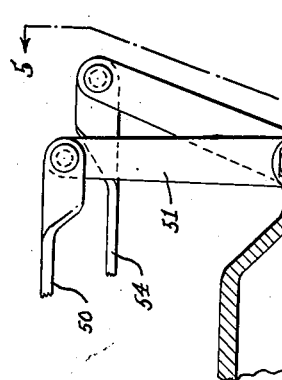
Inventor
Albert B. Clark

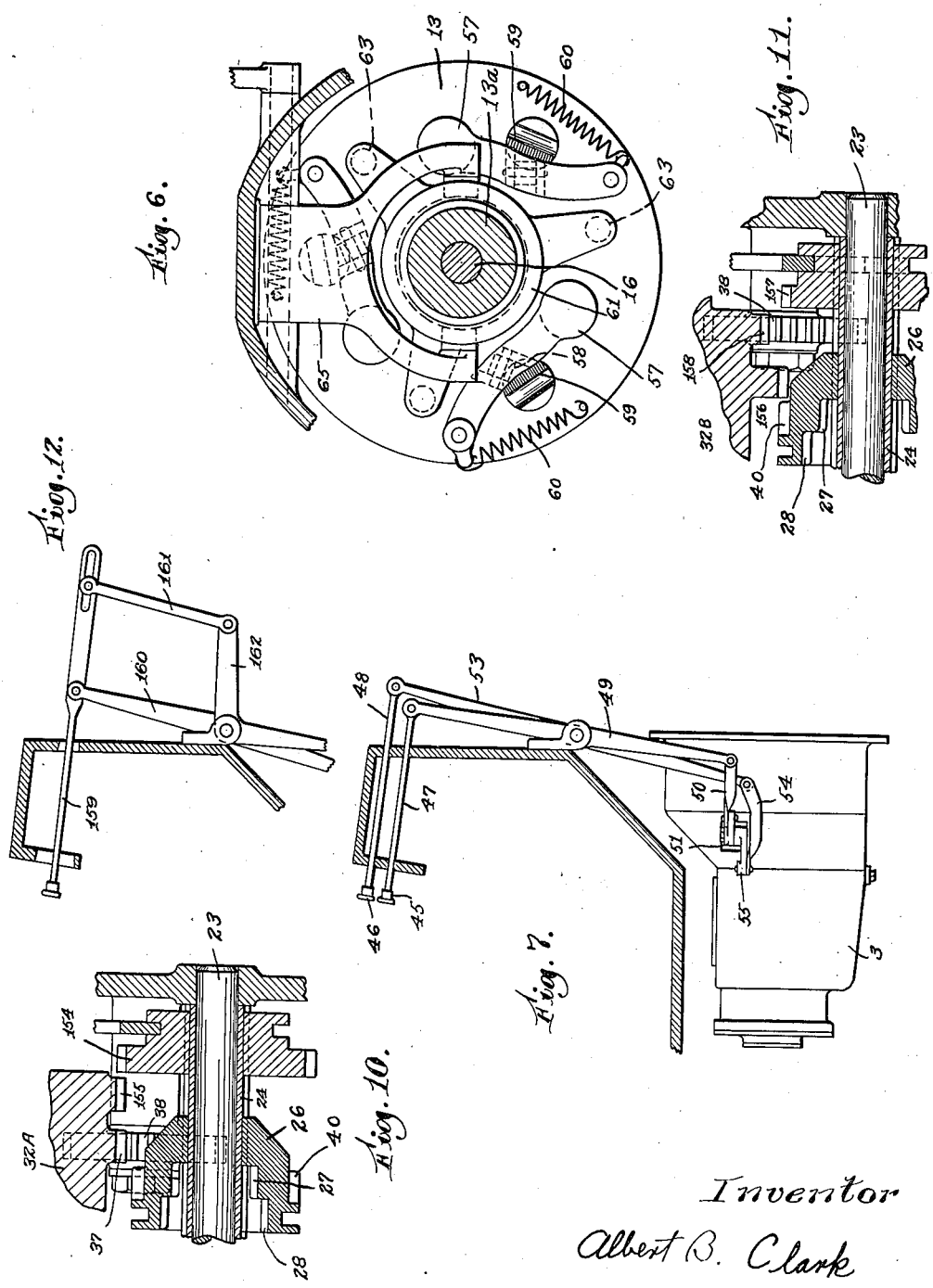

Oct. 29, 1935.  A. B. CLARK  2,019,174
SPEED CHANGE GEARING DEVICE
Filed Feb. 14, 1934  5 Sheets-Sheet 4

Inventor
Albert B. Clark

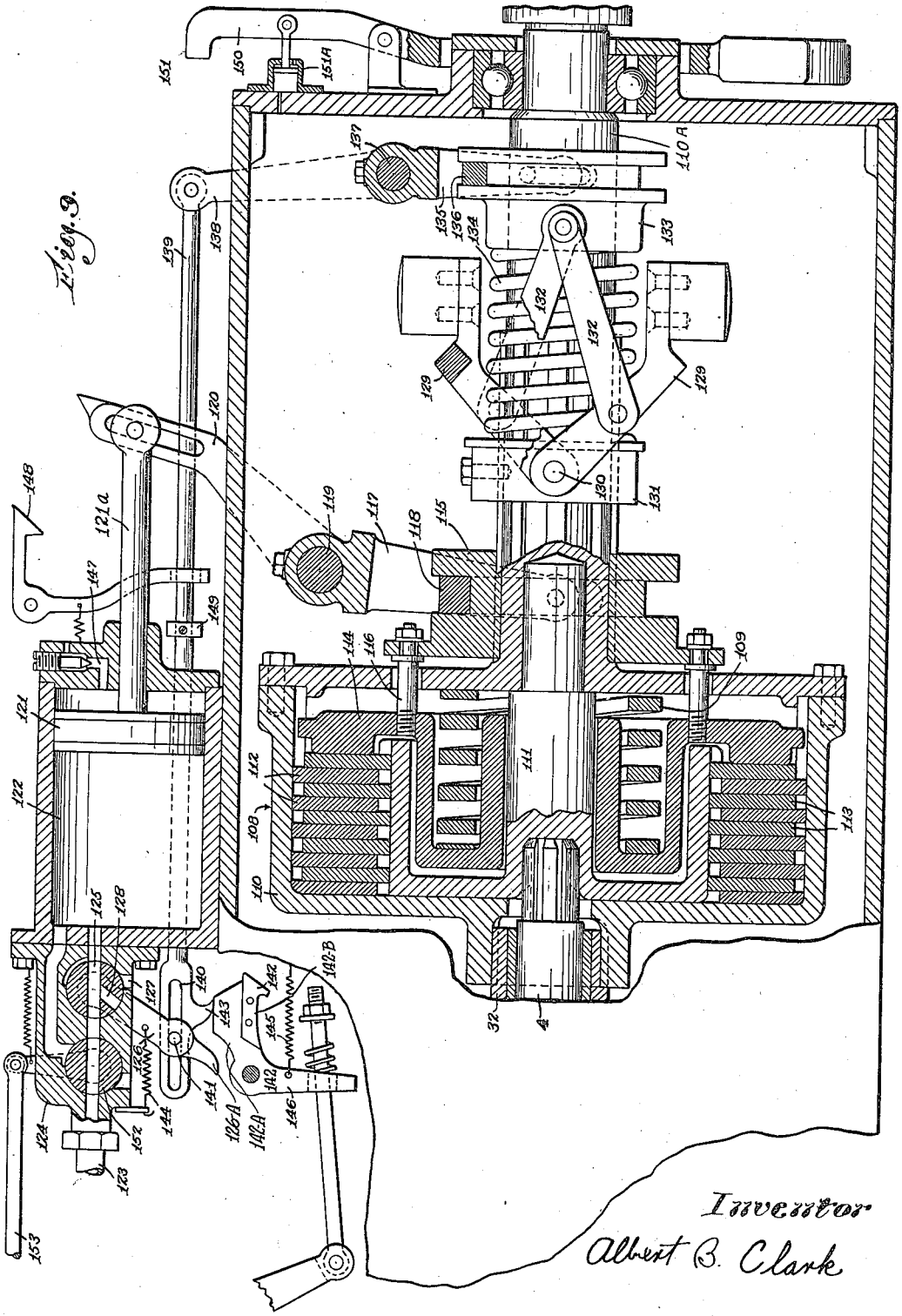

Patented Oct. 29, 1935

2,019,174

UNITED STATES PATENT OFFICE 2,019,174

SPEED CHANGE GEARING DEVICE

Albert Burdett Clark, Dorchester, Mass., assignor of one-fifth to Olem. Dahl, Boston, Mass.

Application February 14, 1934, Serial No. 711,170

18 Claims. (Cl. 74—336)

My invention relates to improvements in speed change gearing devices.

One object of this invention is to provide an improved transmission of the sort employing a mechanism which may be classed as a speed change mechanism for obtaining certain speed changes without free engine rotation and without shifting gears therefor.

Another object is the embodiment with selective gear mechanism, in an improved manner, of speed change mechanism of the character above mentioned.

A more specific object is to provide a construction whereby positive reduced speed drive especially reverse may be secured without the necessity of releasing the speed change clutch or of disconnecting the overrunning clutch used for reduced speed drive, and regardless of whether the speed change clutch is engaged or released, which construction provides a transmission better suited for automatic control of the speed change clutch.

Another object is the effecting of improvements generally in transmission devices of this nature.

Another object is to provide a transmission mechanism of this nature which is compact, simple, which meets the demands of economical manufacture and which may be easily taken apart.

Another object is to provide a novel control means for manipulating the selective gear shift members utilized in connection with my invention.

Still another object is to provide improved speed change clutch automatic controlling means.

To this end and to others to which the invention may appertain and which will become apparent from a study of the specification and the accompanying drawings thereof, the invention consists in the novel construction and manner of arrangement, and in the combination and adaptation of the parts, of the elements and of the whole as outlined herein and pointed out in the appended claims. It is understood that changes may be made in the shape, size and proportion of the parts and in minor details, without departing from the spirit of the invention or its scope.

The invention is particularly adapted for use in motor driven vehicles and in this respect has been illustrated in the accompanying drawings, in which Figure 1 is a longitudinal vertical section thru a transmission constructed in accordance with my invention.

Figure 2 is a cross-section on line 2—2 of Fig. 1.

Figure 3 is a cross-section on line 3—3 of Fig. 1.

Figure 4 is a plan section on line 4—4 of Fig. 1.

Figure 5 is a cross-section on line 5—5 of Fig. 4.

Figure 6 is a cross-section on line 6—6 of Fig. 1.

Figure 7 is a diagrammatic view showing the instrument board control mechanism for shifting the selective gear members.

Figure 9 is a similar view of another form of this automatic control mechanism.

Figure 10 is a vertical section, showing modification of a portion of the gearing of my invention, for securing a positive forward speed reduction as well as reverse.

Figure 11 is a similar view of another modification of gearing for securing a positive forward speed reduction besides reverse.

Figure 12 is a diagrammatic view of a modified form of control means for shifting the selective gears, as utilized in that form of the invention illustrated in Fig. 1.

It will be seen that my invention has to do with improvements in transmissions of the character embodying special speed change mechanism I have devised, which I prefer to call a continuous drive speed change mechanism, inasmuch as speed changes may be secured thereby without free engine rotation, by the engagement or release of a special power transmitting unit which is illustrated in the form of a disc clutch therefor.

In describing this continuous drive speed change mechanism for a clearer understanding, it will be seen that in one rotative direction, by its means, one shaft element may turn another shaft element at the same speed through the medium of the special clutch when this clutch is engaged fully, and at a reduced speed through means of specially arranged reduction gearing and an overrunning clutch connection. In this rotative direction this reduction gearing is designed to cause the first said shaft to operatively turn the second said shaft slower through means of the overrunning clutch binding elements when the special clutch is fully released. The arrangement and ratios of these gears are such that in this rotative direction the overrunning clutch is designed to release and overrun automatically when the special clutch is engaged.

It will be seen and described more fully hereinafter in connection with my invention that selective gearing is incorporated with the continuous drive speed change mechanism in such a manner that a positive speed reduction drive especially reverse may be secured without disconnecting the overrunning clutch and regardless of whether the said special clutch is released or not, hence the arrangement makes a transmission of this nature particularly adaptable for use with automatic control for the said special clutch.

The association and arrangement of the parts and elements as outlined above enable a compact, simplified and highly efficient mechanism to be obtained with a minimum of gears and parts.

Figure 1:
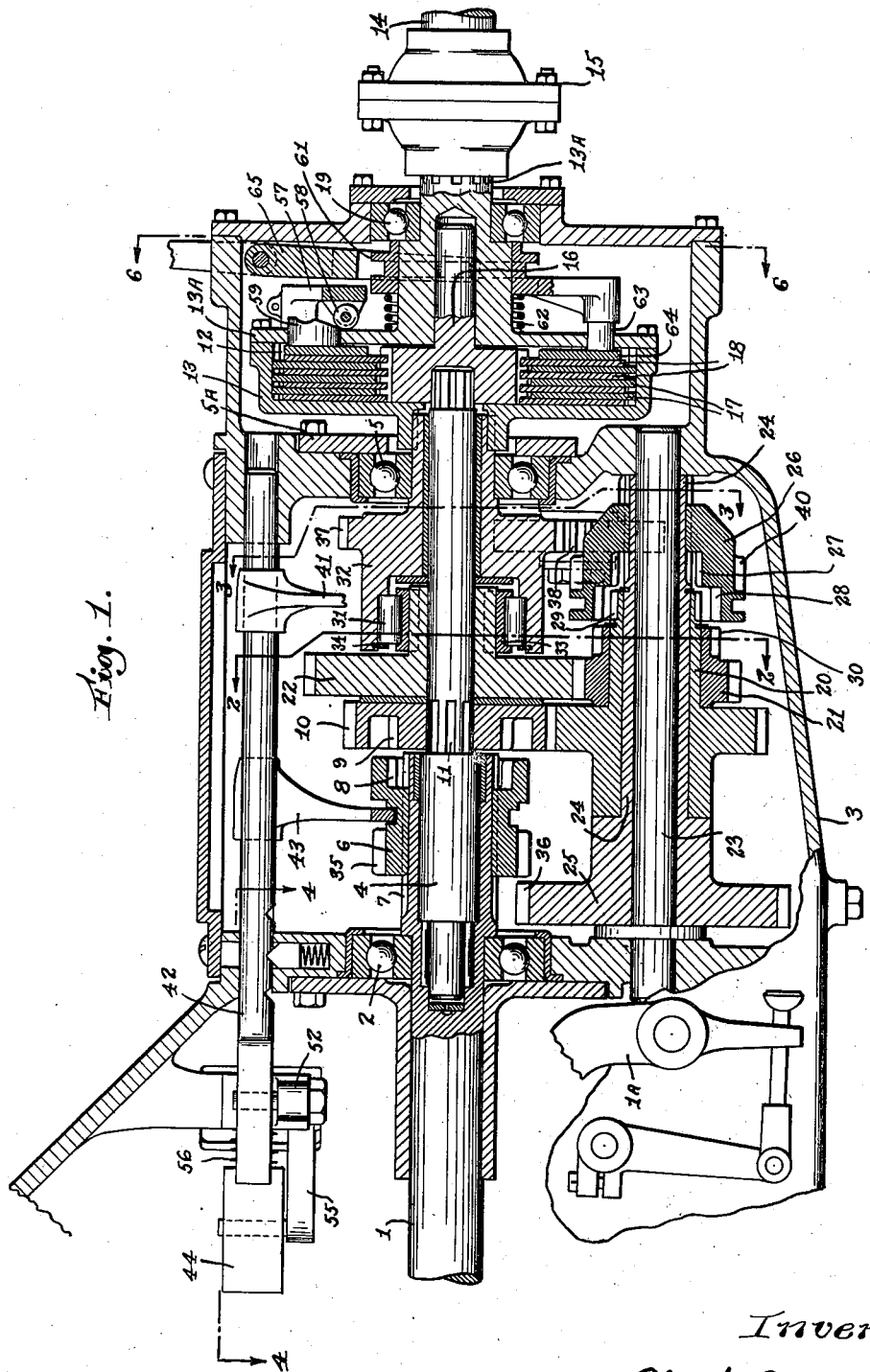

Describing the mechanism illustrated in Fig. 1 first, in which countershaft gears are used to secure all speed reduction gear drives, and referring to the drawings, the reference numeral 1 designates the transmission shaft adapted to receive power from the engine in a well known way through an engine releasing clutch which may be of a power actuated or automatic type. The engine clutch pedal 1—A is shown to enable the driving end of the transmission and its rotative direction to be easily ascertained. The shaft 1 is adapted to be rotatively supported in suitable bearings 2 in the transmission casing 3 in a well known manner. Another transmission shaft 4 in alignment with shaft 1 is rotatively supported at one end within a bored portion of shaft 1, and at the other end its support is maintained by suitable bearings 5 disposed in the transmission casing partition. A bearing cap 5—A keeps the bearing in position.

To transmit power from shaft 1 to shaft 4, a transmission member 6 is slidably secured to shaft 1 by splines 7 or equivalent means. The member 6 is provided with teeth 8 or equivalent engaging means designed for mutual engagement with cooperative teeth 9 turning with shaft 4. By this means shafts 1 and 4 may be connected at will so as to turn as one. In the case shown, engaging teeth 9 are cut on the hub of a gear 10 secured by feathers 11 or equivalent means to shaft 4. Obviously engaging means 9 may be otherwise suitably attached so as to turn with shaft 4 or they may be made integral therewith. On forward drive power is transmitted from shaft 4 to the propeller shaft elements at an unchanged or one to one speed ratio through the medium of the special locking clutch 12. The casing element 13 of this clutch is designed to turn as one with the propeller shaft driving element 14 to which it is secured in a well known way by suitable means such as the universal joint 15 shown, while the rotor element 16 of this clutch is attached by splines, keys, or feathers, or other suitable means, to shaft 4 so as to turn as one therewith. Cooperative friction plates 17 and 18 are designed to be attached to clutch casing 13 and clutch rotor 16 respectively. These friction plates when pressed together by suitable clutch actuating mechanism are designed to cause shaft 4 and the propeller shaft element 14 to turn as one. I prefer to have the support of clutch 12 rotatably maintained at one end by bearings such as 19 suitably disposed in the transmission casing 3, to support the sleeve end 13—A of clutch 12. In further connection with clutch 12 it will be apparent however that this clutch may be wholly supported on an extension of shaft 4 without changing the function of the mechanism, in which case bearing 5 can be eliminated if desired. The arrangement shown however enables this clutch to be easily removed without disturbing the gearing. Other advantages are realized also, especially in connection with shaft 4 which may be lighter because of its shortness.

Proceeding with the description, to enable a reduced speed in the normal rotative direction which we are following, to be given to the propeller shaft element 14 relative to and from shaft 4, two countershaft gears 20 and 21 are arranged so that gear 20 is in constant mesh with gear 10, and gear 21 is in constant mesh with another gear 22. Gear 22 is adapted to be rotatably mounted on shaft 4, while gears 20 and 21 are designed to rotate on the axis of a countershaft 23 supported by the transmission casing 3, all substantially as shown. Gear 20 is adapted to be rotatably mounted on a sleeve or hub 24 therefor of a transmission gear member 25. This sleeve 24 in the case shown is rotatably mounted on the countershaft 23, but it may be fixed to the countershaft while the latter may rotate with it. Gear 21 is adapted to be rotatively mounted on the sleeve or hub thereof of gear 20. The two gears 20 and 21 are kept from displacement by snap rings or other suitable means at one end and at the other by the enlarged portion of transmission member 25. Member 25 is kept from axial displacement by thrust bearings suitably disposed between it and the transmission casing, or by other suitable means. Another transmission member 26, is slidably secured to the sleeve 24 by means of splines or equivalent means so that they will both turn as one, substantially as shown. This member 26 is equipped with two sets of clutch teeth 27 and 28 or equivalent engaging means.

When the member 26 is moved to the left teeth 27 thereof are designed to be put into mutual engagement with similar clutch teeth 29 formed on the end of the hub of gear member 20, while clutch teeth 28 are put into mutual engagement with clutch teeth 30 on the end of the hub of gear member 21. From the foregoing it will be seen that when the member 26 is slid to the left far enough, gears 20 and 21 will turn as one together with transmission member 25 and with member 26; consequently rotation from gear 10 on shaft 4 will then be imparted to gear 22. By using suitable gear ratios the speed of gear 22 relative to that of gear 10 may be reduced as much as desired. For easier meshing it is desirable to have one of the two sets of engaging teeth 27 and 28 mesh slightly before the other set. Gears 10 and 20 being in constant mesh and gears 21 and 22 likewise, they may be equipped with helical or herringbone type teeth for quiet operation and smoothness. Suitable thrust bearings may be interposed where necessary.

For transmitting rotative power from gear 22 to the propeller shaft for its speed reduction drive, a one way clutch commonly called an overrunning clutch is disposed between gear 22 and a transmission element 32 arranged therefor and rotatably mounted on shaft 4 and in this case disconnectably attached to the casing of clutch 12 by splines of other suitable means. After the manner of overrunning clutches this one has inner and outer members having suitable binding surfaces. The inner binding member is a sleeve 33 having a suitable binding surface, and adapted to be detachably secured to the hub of gear 22. In this case transmission member 32 itself forms the outer binding member, and for this purpose is made with internal cam surfaces adapted to rollers for binding purposes. Obviously the outer binding member may be detachable from member 32 if preferred.

The arrangement is such on normal or forward drive, which rotative direction we have been following, that when clutch 12 is released, power may be transmitted from gear member 22 to transmission member 32 by the binding action of the rollers 31 or other suitable binding means disposed between the sleeves of the overrunning clutch for that purpose. Snap rings 34 serve to keep the rollers in place. By correctly arranging gear ratios so that gear 22 will turn slower than gear 10, obviously the desired speed reduction can be obtained. In this same rotative direction with gear 22 turning slower than gear 10, it is obvious that gear 22 will simply run idle when clutch 12 is engaged, the one way clutch simply overrunning then. It is also apparent that in this rotative direction the one way clutch is free to overrun when the clutch 12 is disengaged if the propeller shaft turns faster than the shaft 4 such as would be the case when descending a hill with the power shut down. A free-wheeling effect is then obtained.

In connection with transmission member 32, this member may be made integral with the casing element or with a portion thereof, of clutch 12, if it is desired to extend shaft 4 to support this clutch, eliminating the bearing 5 as hereinbefore pointed out.

From the foregoing it will be seen that the propeller shaft may be turned either at the same speed as shaft 4 or at a reduced speed as desired and without shifting gears, simply by the engagement or disengagement of clutch 12.

To obtain additional speed reductions, as well as for obtaining reverse drive, transmission member 6 is equipped with gear teeth 35 adapted when member 6 is moved to the left, to be put in mesh with cooperative gear teeth 36 with which transmission member 25 is equipped. The arrangement is such that when member 6 is in its intermediate position as shown it is entirely out of engagement with teeth 36 and clutch teeth 9, this position being its free or neutral position, enabling shaft 1 to be turned independently of the other transmission gears. As far as this invention is concerned gear teeth 35 instead of being a part of member 6 may be on a member separate therefrom rotative on shaft 1 and in constant mesh with gear teeth 36. In this event member 6 would be provided with clutch teeth for enabling it to turn the teeth 35 as one therewith, at will. Constant mesh selective gears of this ordinary type are well known, and the function is equivalent to that shown, so is not illustrated in the drawings.

Proceeding with the description, when gear teeth 35 are put in mesh with gear teeth 36 and clutch 12 is engaged, a different and lower speed reduction may be obtained. On this reduced speed drive the rotative power is transmitted from gear teeth 35 to gear teeth 36, and if transmission member 26 is in engagement with gears 20 and 21, the power will be transmitted from gear teeth 36 through gear 20 turning therewith to gear 10 and shaft 4, and from thence through the friction plates of clutch 12 to the propeller shaft. On this drive, gear 22, is designed to simply idle, the one way clutch simply overrunning.

To obtain still another speed reduction in the same rotative direction now, it is simply necessary for clutch 12 to be released, whereupon gear 21 is designed to turn gear 22 at a slow speed, and gear 22 through the overrunning clutch connection will turn member 32 and consequently the propeller shaft, at the same speed. On this slow speed drive, gear 20 being also clutched with gear 21 will of course turn gear 10 and shaft 4, but these last two will then simply run idle. Obviously gear ratios should be properly balanced to assure proper functioning of the mechanism on all speeds.

From the foregoing it will be seen that in this particular embodiment of my invention only one of the two gears 20 and 21 is used in securing any one of these two last described speed reduction drives. One of these speed reductions drives thru the overrunning clutch connection and the other drives thru the friction plate elements of clutch 12. If an assembly is desired to permanently make use of only three of the possible speed ratios so as not to transmit any speed reduction gear drive thru means of the friction plates of clutch 12 or for other reasons such as to cut down the relative rotation between shaft 4 and the members rotative thereon on a speed reduction gear drive, connective means may be easily established to release the forward speed driving action of gear 20 on such a speed reduction gear drive, thereby cutting out the second lowest of the speeds obtainable with the assembly shown.

Now proceeding with the description of that form of my invention illustrated in Fig. 1; for reversing the propeller shaft elements and consequently the vehicle, the member 32 is equipped with gear teeth 37 designed to be in permanent mesh with a reverse idle gear 38 which is rotatably mounted on a small shaft 39 supported in the transmission casing. Transmission member 26 is equipped with gear teeth 40 adapted to be put in mesh with the said idle gear when the said member 26 is moved axially to the right. In its intermediate position between the idle gear and gears 20 and 21, the member 26 is in neutral or free position and no power is then transmitted by it. For causing member 26 to slide axially on sleeve 24 at will it is equipped with a circular groove adapted to a shift fork 41 carried by a shift rod 42 slidable within the transmission. For causing transmission member 6 to slide axially on shaft 1 at will a similar shift fork 43 and shift rod 44 is provided.

In reversing, teeth 35 of transmission member 6 are put into mesh with teeth 36 of transmission member 25, the same as for low forward speeds, and transmission member 26 is also put into mesh with the reverse idle gear 38. Rotative power is then transmitted from shaft 1 to sleeve 24 and to transmission member 26 at a slow speed and in the same direction as for forward speed. From member 26 the power is transmitted to reverse idle gear 38 and from thence to member 32 which is caused to turn in a reverse direction and at a slow speed relative to shaft 1. Member 32 is of course in direct connection with the propeller shaft elements through the medium of the casing elements of clutch 12, hence will turn the propeller shaft at the same speed in the same direction. In connection with reverse drive it will be seen that if either or both of gears 20 and 21 were permanently connected to sleeve 24, means would have to be provided for also positively releasing clutch 12 and/or the overrunning clutch in order to secure reverse under varying conditions of engagement of clutch 12 which would be undesirable and complicate the mechanism especially when automatic control is used for the speed change clutch 12.

In the form of my invention illustrated in Fig. 1, gear members 6 and 26 may both have to be shifted in securing certain speeds, therefore for putting the selective gear members adapted for shifting, into and out of proper engagement simultaneously at will, I have devised a simple and novel shift mechanism which is illustrated in one of its forms in Figs. 1—4—5 and 7.

This shift mechanism comprises substantially, two control handles or knobs 45 and 46 disposed respectively on control rods 47 and 48 projecting through the instrument board or other convenient place. The control rod 45 is connected thru suitable linkage to the reverse gear shift rod 42. This linkage in this case comprises, a lever 49 pivotally attached at one end to rod 47 and at the other to a link 50. The other end of this link is pivotally secured to one end of a lever 51 whose other end is pivoted in turn to one end of a shift lever 52. The other end of this shift lever 52 is flexibly secured to shift rod 42 by spring tension means as shown. The control knob 46 is connected through other suitable linkage to gear shift rod 44. This linkage comprises a lever 53 pivoted at one end to rod 48 and at the other to a link 54. The other end of this link is pivotally secured to one end of a shift lever 55 whose other end is flexibly secured to gear shift rod 44 by spring tension means, substantially as shown. A substantially strong spring 56 is so disposed on shift rod 44 that pressure against it by either of the levers 52 or 55 will move accordingly the gear shift rod flexibly secured to the other of these two levers.

Thus with this shift mechanism, pushing the one control knob 45 way in will not only shift gear member 26 into engagement with reverse idle gear 38, but will also simultaneously put gear member 6 into mesh with countershaft gear teeth 36, whereby the transmission is put in condition for transmitting positive reverse, and without manipulating two controls therefor.

This control arrangement also eliminates the possibility of gear 26 being in mesh with the reverse idle gear when teeth 8 are in mesh with teeth 9, which condition would be harmful to the gearing mechanism. From this reverse condition now, to put the transmission into condition for starting on forward low speed range it is simply necessary to pull the control knob 45 way out which puts the member 26 into mesh with clutch teeth 29 and 30, but leaves transmission member 6 in mesh with the countershaft gear teeth 36, ready for low speeds. Now from this condition, to obtain high speed range when desired, it is simply necessary to pull control knob 46 way out which puts transmission member 6 into engagement with clutch teeth 9. If it were desired to start on forward high speed range from reverse, it is simply necessary to then pull the one control knob 46 way out, whereby transmission member 6 is put into engagement with clutch teeth 9 and furthermore by means of the pressure of lever 55 against shift rod 44 and spring 56 and consequently against lever 52, transmission member 26 is automatically thrown out of mesh with the reverse gear and into mesh with clutch teeth 29 and 30, whereby the transmission is put in condition for forward drive on the two high speed ratios, or high speed range as it is called.

In connection with this shift gear control, the shift rod mechanism may be interconnected in other ways, and instead of the linkage shown, flexible control means may be used if desired. This novel control means may be used in connection with other selective gear arrangements, where suitable. Of course with an ordinary selective gear shift method utilizing the common single lever control, gear member 26 would have to be into engagement with clutch teeth 29 and 30 to be correctly positioned with respect to the neutral position gear member 6 is shown in, or else gear member 6 would have to be in engagement with gear teeth 36, in order to be positioned correctly with respect to the position gear member 26 is shown in. Obviously with the ordinary shift method utilized the correct positioning of the selective gear shift members would be assured by lugs or slots of the usual type disposed in a well known way on the shift rods.

Now in connection with the speed change clutch, it will be seen that transmissions constructed in accordance with my invention are particularly suitable for use with automatic clutch control for actuating the speed change clutch. This desirability is especially evident with the means set forth for securing reverse, whereby this drive is positive regardless of the degree of engagement of the speed change clutch. Obviously the gearing portion of my invention may be utilized in connection with any suitable means such as a manual control lever or pedal for controlling the speed change clutch 12, but as it is desirable to have automatic control means for this clutch, I have devised a novel, improved and effective automatic control means therefor.

In my U. S. Patent No. 1,641,576, patented Sept. 6, 1927, I have shown an automatic clutch control of plain centrifugal weight type for automatically engaging and releasing a speed change clutch connected with reduction gearing of a different type.

Figure 8:
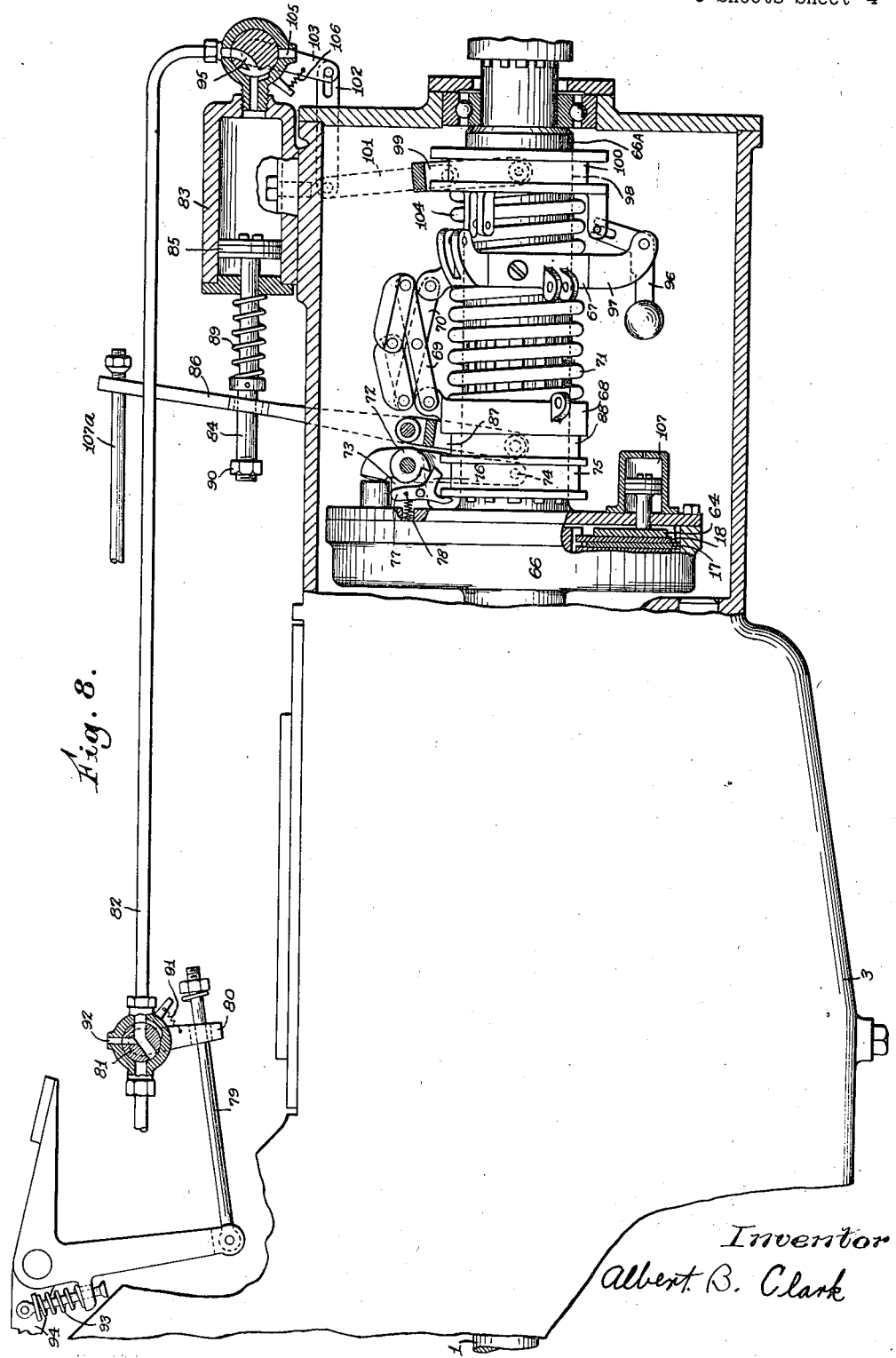
Figure 8 is a view, partly in section and partly in perspective, of the speed change clutch automatic control mechanism which I have devised.

In Fig. 1, I have illustrated a simple centrifugal weight type automatic clutch control for the speed change clutch. This comprises the weighted lever arms 57 pivotally mounted in the case shown, on the cover plate portion of speed change clutch casing 13, so that they may be swung outward by centrifugal force when the clutch casing rotates. These centrifugal arms are preferably anti-frictionally mounted and equipped with anti-friction clutch press rollers 58, whereby when the centrifugal force is great enough the arms will fly out with such pressure that these rollers will easily ride over the inclined ends of the clutch press pins 59 secured to the clutch pressure ring 64, forcing them in, which will cause the clutch plates 17 and 18 to be put into frictional engagement. The arms 57 each have one end secured to a returning spring 60 whereby when the centrifugal force is reduced sufficiently, the pull of these springs will cause the weighted arms to be centralized and the speed change clutch thereby released from engagement. The control mechanism may be arranged so that this clutch will engage or start to engage at any predetermined car speed. I have provided a shallow depression on the exposed end of each of the press pins 59, so that the rollers 58 and centrifugal arms 57 will be retained thereby in their clutch engaging position until the car speed is reduced enough so that the force of the returning springs 60 will overcome the centrifugal force and the resistance of the shallow depressions offered to the arms 57. In connection with Fig. 8, it will be seen that I have provided a different catch means for retaining the automatic centrifugal clutch engaging arms in their clutch engaging position until the predetermined releasing speed is reached. In Fig. 8, I have also provided power release means for the speed change clutch, which means is operated by depressing the accelerator pedal way down, whereby this clutch may be released at will provided the car is not going over a certain predetermined high speed, as will be explained hereinafter, as will also be explained why this power release means is especially valuable on hills and in traffic.

I have also illustrated in Figs. 1 and 6 a manual control means for engaging clutch 12, at will, to prevent free wheeling through the overrunning clutch, when desired. This mechanism may be of a well known type such as the clutch collar 61 normally held away from the clutch casing 13 by a light coil spring 62 and adapted when moved axially to the left, to force clutch press pins 63 and press ring 64 secured thereto, against the resistance elements of clutch 12 thus engaging the clutch and causing the power to be transmitted through the clutch resistance elements instead of through the overrunning clutch connection. Any suitable control lever and linkage may be used to manipulate this means, connected to the clutch collar throw fork lever arm 65.

In connection with the clutch automatic control just described, it will be obvious that such a plain type as shown, is very limited in its control functions, hence it is an object of this invention therefore to provide an automatic control for the speed change clutch which will also provide for speed changes by this clutch under other conditions such as on hills, in traffic, etc., and which for this purpose will be under the control of the operator at certain times. This novel speed change clutch automatic control mechanism which I have devised includes broadly; automatic, centrifugal weight controlled clutch actuating means, arranged for automatically causing the speed change clutch to engage when an approximate predetermined car speed is reached, and arranged also to automatically cause this clutch to release when an approximate predetermined low car speed is reached; and means, arranged to be controlled by depression of the accelerator pedal, adapted for use normally to release the speed change clutch when desired in certain cases when it would otherwise be engaged, for use such as on hills or when the car is proceeding below a predetermined speed with this clutch engaged, when it is desired to thus reduce the speed ratio. Automatically controlled means for cutting out the said accelerator clutch release means above an approximate predetermined car speed, so that the speed change clutch can not then be released by depression of the accelerator pedal, may be used in one form of speed change clutch automatic control means illustrated in Fig. 8, and described hereinafter, in which centrifugal weight means is used to directly engage the speed change clutch.

In describing that form of the speed change clutch automatic control mechanism which is illustrated in Fig. 8, it will be seen that part of the speed change clutch and that portion of the transmission necessary to illustrate the invention are shown similar to the same parts in Fig. 1; however the speed change clutch automatic control mechanism may be used with other types of transmissions, obviously.

Referring therefore to Fig. 8, it will be observed that in this case the speed change clutch sleeve or hub 66—A corresponding to sleeve 13—A in Fig. 1, is made longer to accommodate centrifugal weight clutch control mechanism. In this mechanism a collar 67 is secured to sleeve 66—A. A spool 68 is slidably mounted on this sleeve which is preferably splined or feathered therefor, and centrifugal weight clutch actuating means is provided functioning to cause spool 68 to be pulled axially away from the speed change clutch 66, with force enough to engage this clutch when an approximate predetermined car speed is reached for which the mechanism is adjusted. Clutch 66 corresponds to clutch 12, in Fig. 1. The centrifugal weight control means in this case has weighted cross-arms 69 and 70, respectively secured by pivots to spools 68 and collar 67. A coil spring 71 serves to keep the weighted arms normally centralized. For enabling this means to properly engage the speed change clutch when a predetermined car speed is reached, clutch press levers 72 are pivotally attached to suitable projections 73 on the clutch casing element and one end of each of these levers is equipped with a suitable engagement pin or lug 74. These pins are designed to extend in this case into a comparatively wide groove or recess 75 on spool 68. This arrangement is such that when the car reaches the approximate predetermined speed, the axial movement of the spool 68 caused by the weighted arms flying outward reaches a point where the spool is caused to press firmly against the clutch press lever pins 74 and to thereby cause the clutch 66 to engage.

To normally hold the clutch 66 engaged after it has been put in this condition, each of the press levers 72 in this case is arranged with suitable depressions or recesses adapted to receive projections 76 of catch fingers 77 which are forced to enter therein by pressure springs 78 when spool 68 reaches a point where the clutch 66 is fully engaged. These catch fingers or levers are pivotally attached to suitable supports on the casing of clutch 66. They are designed to be released from the press levers 72 when the car is slowed to an approximate predetermined speed for which the mechanism is adjusted. This is caused by axial movement of spool 68 towards the clutch 66 as the car speed slows and the weighted arms are centralized, reaching a point where the spool 68 presses firmly against the fingers 77, thus withdrawing them from the levers 72. The groove 75 is made so that spool 68 is free to move far enough axially towards the clutch to release the catch fingers 77, without interference by the pins 74. The comparative wideness of this groove serves as a simple means for preventing the speed change clutch from being engaged again, until the desired predetermined speed is reached, for which the mechanism is adjusted.

It will be seen from the foregoing that with this automatic control mechanism, after the speed change clutch has been disengaged by the centrifugal weight means being centralized, it is normally held in this condition until a certain predetermined car speed is reached, for which the mechanism is adjusted, which speed may be fifteen or twenty miles per hour, whereby the weighted arms reach a point where the speed change clutch is caused to be fully engaged, in which condition it is then normally held until a predetermined low car speed is reached again, which may be three or four miles per hour, whereby the clutch press levers 72 are caused to release the speed change clutch in the manner stated. Obviously the exact predetermined speeds at which these speed changes take place depend on gear ratios and other factors.

Now to enable the operator to release the speed change clutch so as to put the transmission on reduced drive when desired, in cases where it would otherwise remain engaged, power means is provided whereby the speed change clutch may be released by depressing the accelerator pedal a predetermined extent, preferably its limit. For this purpose the accelerator pedal is connected by suitable means such as the link 79 to the control lever 80 of a valve 81 in a suction line 82 running from the engine to a cylinder 83. A piston rod 84 connected to a piston 85 disposed in this cylinder is in operative connection with a lever arm 86 of a clutch throw fork 87 adapted to a groove 88 on the spool 68. The piston rod 84 is adapted to run loosely through a hole in lever arm 86, instead of being pivoted thereto so as to enable the spool 68 to be moved back and forth axially its full limit without interference by piston 85, when the latter is in its normal pulled out position. This arrangement also allows the piston 85 to be returned to normal pulled out position by a coil spring 89, directly that suction is cut off from cylinder 83 and air is allowed to enter.

An adjustable nut 90 suitably disposed on piston rod 84 serves to enable this rod to pull lever arm 86 when suction is applied to the cylinder 83, causing the speed change clutch to be released even though centrifugal force would otherwise cause this clutch to be engaged. In this case the valve 81 in the suction line is so arranged, that when the accelerator pedal is pressed down its limit it pulls link 79 which opens this valve 81 so that suction from the engine is applied to the cylinder 83, pulling in piston 85. A spring 91 exerts a pull on valve lever 80 which causes this valve 81 to close when the accelerator pedal is let up. An atmospheric port 92 in valve 81 is designed to open so as to let air through this valve and into cylinder 83 when this valve closes. I prefer to utilize a pressure spring 93 between the accelerator pedal and the accelerator throttle control 94. This spring is designed to be of sufficient strength to enable the accelerator gas throttle to be fully opened by pressure on the accelerator pedal without contracting this spring appreciably. The arrangement is such that a slight further and additional pressure on the accelerator pedal will then cause valve 81 to open, consequently releasing the speed change clutch.

This accelerator pedal controlled speed change clutch release means is especially useful on hills when the car might otherwise be laboring even under full throttle. It is also especially useful in traffic for a quick get away, and although under the control of the operator, so it can be used at his discretion, is practically automatic requiring no extra controls to think about, and making use of usual driving customs, as it is common practice to press the accelerator down anyway, when making a quick get away and when the car is laboring on hills.

Obviously if the car were proceeding at a fairly high rate of speed, there would normally be no need to put the transmission on reduced drive, hence I have provided also, automatically controlled means for cutting out the accelerator pedal controlled suction clutch release means, above a predetermined car speed, for which the mechanism is adjusted. This cut out means includes a valve 95 disposed in the suction line 82, between the valve 81 and the cylinder 83. This valve is designed to be controlled by small centrifugal weighted arms 96 in this case fulcrumed to support members 97 interspaced on collar 67 between weighted arms 70. A spool 98 slidably mounted on sleeve 66—A is pivotally attached to weighted arms 96 by suitable connective means, and a throw fork 99 adapted to a groove 100 on this spool has a lever arm 101 connected by suitable means such as the link 102 to the control lever arm 103 of valve 95. A coil spring 104 serves to keep the weighted arms 96 normally centralized and the valve 95 consequently opened.

The arrangement of this suction cut out mechanism is such that when the car reaches an approximate predetermined speed for which the mechanism is adjusted, which speed may be around thirty or forty miles per hour, the centrifugal arms flying outward cause spool 98 to reach a point where link 102 pushes valve lever arm 101 over to the right, thereby closing valve 95 and closing the suction line 82. An atmospheric port 105 in valve 95 is designed to open to admit air to cylinder 83 when valve 95 closes, thereby releasing the piston 85 and allowing the speed change clutch to fully engage, in case this has not already happened when this cut out is applied. A valve return spring 106 connected with the valve lever arm 103 exerts a pull on the latter and causes the valve 95 to open when the car slows down enough so that weighted arms 96 are centralized. In order to insure smooth engagement, I have provided dash pots 107 on the speed change clutch to act as buffers. With this suction cut out mechanism it will be seen that when the car is proceeding at such a rate of speed that a reduced speed ratio is not required, the speed change clutch is automatically prevented from releasing, even though accelerator pedal is fully depressed. Manual control means for the speed change clutch is provided of which the link 107—A is shown.

In such a clutch automatic control mechanism as set forth, obviously the suction cylinder must be large enough to enable the suction force to overcome the centrifugal force of the weighted arms 69 and 70 and the force of return spring 71. Other mechanism, for releasing clutch 66 without centralizing the weighted arms 69 and 70 might be used such as a slip catch mechanism, but such devices are not preferred as the car speed would eventually have to be slowed to reengage the mechanism unless the weights were centralized. It is understood that this clutch automatic control mechanism need not be mounted directly on the speed change clutch sleeve, but any suitable portion may be mounted on a rotative part provided or arranged therefor, and such part may be geared down to a slower speed, and suitable operative mechanism established to the proper parts. If desired the centrifugal weight means may be disposed on the clutch itself or built into it.

In Fig. 9, another automatic control mechanism for controlling the speed change clutch in such type transmissions as set forth herein, is illustrated, in one of its possible forms. In this type of control mechanism, centrifugal weight means is not used directly to actuate the speed change clutch, as in the mechanism illustrated in Fig. 8, but is arranged to control power means for the actual release of the speed change clutch. This power means is preferably of a suction form, the power for which is derived from engine suction, and accordingly the mechanism illustrated in Fig. 9, is designed to be so actuated. It will be seen that this speed change clutch automatic control mechanism like that in Fig. 8, is shown adapted especially for use with transmissions like that illustrated in Fig. 1. Obviously however either of the forms of speed change clutch automatic control mechanism may be used with other types of transmissions, such as those employing counterbalanced internal gears, which may be of the character set forth in my U. S. application for Letters Patent Serial No. 438,828, filed March 25, 1930, and allowed July 9, 1930 or which may be of the character set forth in my U. S. application for Letters Patent Serial No. 490,010. In this last said transmission application Serial Number 490,010 which was applied for Oct. 20, 1930, an overrunning clutch in connection with a speed change clutch is used to establish a speed change, similarly to the transmission set forth in this present invention. The speed change clutch automatic control mechanisms set forth herein may also be used in connection with transmissions of the epicyclic or other type wherein a gear brake is connected to the speed change clutch, one method of which brake connection is shown in my said U. S. application No. 438,828, and another method automatically taken care of is shown in my U. S. Patent No. 1,641,576.

Now proceeding with the description of the specific control mechanism illustrated in Fig. 9, and referring specifically to that figure, the speed change clutch 108 corresponds to speed change clutch 12 of Fig. 1, although of a somewhat different form, as in this type of control a clutch engagement spring 109 is essentially required for holding the speed change clutch friction plates in frictional engagement, instead of using centrifugal weights directly for this purpose as in Fig. 8. I prefer to have this clutch spring located inside the clutch to save space and make a more compact construction, although the control mechanism will operate essentially the same if this spring is located external to the clutch casing.

Instead of utilizing a single large clutch spring as shown for the speed change clutch, a plurality of smaller springs may of course be used, disposed around the clutch hub, either inside or outside the clutch casing, as far as this invention is concerned. The casing element 110 of the speed change clutch, which corresponds to the casing element of the speed change clutch 12 in Fig. 1, is adapted to be similarly detachably connected to the end of transmission member 32, preferably by splines, as shown. The inside rotor element 111 of clutch 108, corresponding to the rotor element 16 of clutch 12 of Fig. 1, is adapted to be similarly detachably connected to the end of shaft 4, preferably by splines, as shown, although it may be supported on shaft 4, if desired as mentioned in connection with Fig. 1. In the same manner as in Fig. 1, one set of clutch plates or friction elements 112 is designed to turn with the clutch casing element 110, while the opposing set of co-operative friction elements 113 is designed to turn with the clutch rotor element 111. In order to make a compact construction, the rotor element 111 is formed with an annular channel, within which the recessed or channeled portion of clutch press plate 114 rotates, substantially as shown. The clutch spring 109 is disposed within the said recessed portion of the press plate, as shown, exerting pressure against it so that the friction elements of the speed change clutch are normally held in engagement. This press plate 114 is adapted to be connected to a spool 115 preferably by suitable connective elements such as bolts or pins 116 which extend through holes in the cover plate of clutch casing 110 as shown. Spool 115 is slidable axially on sleeve 110—A of the speed change clutch.

For moving this spool axially, for causing the speed change clutch to be engaged and released, a clutch operating mechanism is used, which in this case comprises a throw fork 117 adapted to a spanner 118 and secured to a rock shaft 119 which extends out through the transmission casing 3. A lever arm 120 is secured to shaft 119 outside the transmission casing. My novel automatic control mechanism includes means for actuating this lever 120, of which means, the piston 121 disposed in the suction cylinder 122 has its piston rod 121—A connected to lever arm 120, so as to form a suction power device, for releasing the speed change clutch when suction is applied to the said cylinder from the engine through suction line 123.

For controlling the application of suction to the said cylinder to release the speed change clutch, and for cutting off the suction and admitting air to the cylinder to reengage the speed change clutch, a valve box 124 is disposed in the said suction line. A valve 125 in this valve box is so disposed that when the valve arm 126 is moved its limit in one direction the suction line is designed to be opened, whereupon the suction applied to the cylinder will cause the piston 121 to be pulled in, consequently releasing the speed change clutch. When valve arm 126 is moved its limit in the opposite direction, the suction line is designed to be closed by valve 125, and atmospheric air then enters the cylinder through port 127 in the valve box and valve port 128.

For controlling this valve 125 automatically according to my invention, I provide in this case two centrifugal weighted arms, 129, pivotally attached by pins or bolts 130 to a collar 131 secured on sleeve 110—A by screws or other suitable means so as to be adjusted at any desired position on the sleeve. I prefer to have each of the two weighted arms 129 arranged to form a fork or yoke so as to span the said collar substantially as shown, so that the connective links 132 pivotally attached to each arm of the forks at one end may be pivotally attached to a spool 133 slidably mounted on clutch sleeve 110—A, substantially as shown. This arrangement enables the centrifugal weighted arms to pull this spool without friction or binding, as the car speeds. For keeping the centrifugal weights normally centralized a coil spring 134 is provided, which is designed to keep the weighted arms near the center until centrifugal force is strong enough to offset the spring pressure. For enabling axial movement of the spool 133 to open and close the valve 125, a throw fork 135 is pivotally attached to a spanner member 136 adapted to a groove on spool 133, and is secured to a rock shaft 137 which extends out through the transmission casing. A lever arm 138 is secured to this rock shaft outside the casing, and is connected to valve arm 126 by a valve control rod or link 139.

It will be seen that the link 139 is not coupled rigidly to valve arm 126, but is provided with a slot 140 in which a pin 141 secured to valve arm 126 is adapted to extend so as to be free to slide in the said slot, as shown. The arrangement is such and the slot is so adjusted with respect to the valve arm that when the car speed is great enough, it causes the centrifugal weighted arms as they are caused to fly outward by the higher car speed, to reach a point where link 139 is caused to pull against pin 141 of valve arm 126, pulling the valve arm to the right, thus automatically closing the suction line and allowing the speed change clutch to engage, giving the high speed ratio drive, as hereinbefore set forth. The mechanism may be so arranged that the suction valve will be caused to close gradually from any desired speed point, or this valve may be caused to close suddenly when any desired car speed is reached. Suitable spring held trips or other adjuncts may be provided if desired, to snap the valve shut more suddenly. The speed point at which the suction valve is designed to close to give high speed ratio drive is of course predetermined by the type of car, gear ratios used and other factors of engineering determination, taken into consideration when the mechanism is constructed and adjusted, but link 139 should not start to pull valve arm 126 until a car speed about as near as possible to that required to actually close the valve is reached.

After the suction valve is automatically closed against suction by the higher car speed reached, causing the speed change clutch to engage as hereinbefore stated, it is designed to be normally held in this position by a catch 142 or equivalent means which acts to hold valve arm 126 in the closed valve position until a comparatively low car speed is again reached, whence it is designed to be automatically released giving reduced speed ratio, or until released by a manually controlled accelerator pedal control release means, as will be hereinafter described.
For causing the speed change clutch to be released automatically when the proper low car speed is reached, link 139 is arranged with a projecting piece 143. The arrangement of this is such that when link 139 is caused to be moved far enough to the left by the centrifugal weights centralizing as a result of low car speed, the projecting piece 143 is designed to strike an inclined contact surface of catch 142, causing the latter to release the valve arm 126 which is consequently then pulled back by return spring 144 causing the suction valve to open and the speed change clutch to release, giving reduced speed ratio drive. This position is held until the car is again speeded up enough to again engage the speed change clutch. A spring 145 serves to keep the catch 142 normally in position for engaging valve arm 126. The manner in which the catch 142 co-acts with the valve arm 126 may be more easily seen from the following description: when the car attains such speed that link 139 has been pulled to the right a short distance as viewed in Fig. 9, the contact portion 143 extending down from the bottom of this link moves to the right also, away from catch 142, thereby allowing the horizontal arm 142—A of pivoted catch 142 to be swung upwards by the pull of spring 145 until stopped by a lug 142—B on the side of catch 142, which lug then strikes the lower tip 126—A of valve arm 126. When the car speed is increased to the point where the link 139 has pulled valve arm 126 to the right far enough to close the suction valve 125, this valve arm will then have moved to the right out of contact with the catch 142 and its lug 142—B, whereupon the horizontal arm of this catch will be swung further up by the pull of spring 145 in fact far enough so that lug 142—B will prevent the valve arm 126 from being pulled back to the left, until the horizontal arm of the catch is swung down again. This swinging down of the horizontal arm of the catch will be effected when the car speed is slow enough so that the link 139 is moved to the left far enough for its projecting portion 143 to strike against the inclined end of the horizontal arm of the catch 142, the angle of the inclination being such that the horizontal arm is forced down. This horizontal arm may be also swung down when the accelerator pedal is depressed, by means of the accelerator pedal connected linkage connected to the vertical arm of catch 146, as will be described hereinafter.

With the speed change clutch 108 engaged, the piston 121 would assume the operative position shown, hence it is evident that if the motor were stopped while the piston was in the position shown, the piston would remain in such position until the motor was started again, regardless of the car speed since with the motor stopped there would be no suction force to draw it into the cylinder, even if the car speed were slow enough to cause the suction line to open.

In the illustration of the control mechanism in Fig. 9, it is assumed that the motor of the vehicle has been stopped while the speed change clutch 108 is engaged and the mechanism is assumed to be at rest, therefore with no centrifugal force applied to the weighted arms 129, hence they have been centralized by the force of spring 134 thus causing link 139 to release the catch 142, whereby the valve arm 126 has been free to be pulled to the left by spring 144 as shown, so that the suction may therefore be applied to the cylinder when the motor starts or is speeded up enough to develop suction force for this purpose.

The slot in link 139 is made long enough so that valve arm pin 141 will not interfere with the movement of this link in releasing the catch 142 at low car speed. The desired points at which the mechanism is adjusted to open and close the valve channels are predetermined by matters of design, and the specific structure utilized. In many cases the speed change clutch may be arranged to be engaged by means of the automatic control when the car speed reaches about twenty miles per hour, while it may be arranged to be released by the automatic control when a low speed of about two or three miles per hour is reached, although a greater speed than this may be the releasing speed point due to the inherent adhesion of the friction elements in a multiple disc clutch, which type is deemed best for the speed change clutch owing to its small size and compactness in proportion to holding power.

Now in order to provide for releasing the speed change clutch in other conditions, such as to obtain reduced speed drive on hills, in traffic, etc., in cases where the speed change clutch would otherwise be engaged, I have arranged my novel and effective accelerator pedal controlled release means for this purpose, corresponding to that set forth in connection with Fig. 8. This release mechanism as hereinbefore stated, while being under the control of the operator in certain conditions, nevertheless is practically automatic in effect, requiring no extra controls to manipulate and making use of usual driving customs.

For this purpose an accelerator pedal control device similar to that shown in Fig. 8 is designed to be connected operatively to catch 142, whereby the accelerator gas control valve is controlled through the medium of a pressure spring or equivalent means as hereinbefore set forth, so that the gas may be fully applied without necessarily releasing the catch 142. This catch may be released when desired by a further and harder pressure on the accelerator pedal, in the same manner as set forth in connection with Fig. 8. In Fig. 9, since the accelerator pedal and throttle control device will be similar to that in Fig. 8, only a section of the accelerator pedal is shown.

In the control mechanism illustrated in Fig. 9, however, instead of the accelerator pedal being connected by link 79 to the suction valve arm as in Fig. 8, it is connected instead to the lever arm 146 of catch 142.

From the foregoing it will be seen that with this accelerator pedal controlled speed change clutch release means, when the car is laboring on hills with the speed change clutch engaged, or when it is desired to make a quick get-away in traffic or in other cases, the speed change clutch may be released by simply pressing down fully on the accelerator pedal. It will be seen that this accelerator release will not cause the speed change clutch to be released at high car speeds when the centrifugal force is great enough to cause link 139 to hold the suction valve closed, and obviously there is no need then for the speed change clutch to be released ordinarily.

In order for the operator to be able to adjust the mechanism so that the speed change clutch may be engaged and released as quickly or as slowly as desired, I have provided suction cylinder 122 with an adjustable atmospheric valve 147. An adjustable suction line valve may also be provided, if desired, to control the rate of application of suction to cylinder 122. An adjunct such as a valve check which may be of fluid or other form may be used to prevent suction valve 125 from closing too rapidly.

I have also provided an auxiliary catch device 148, arranged to positively hold the speed change clutch released, which device is especially useful in case the suction should be unduly decreased or stopped for any reason, thus eliminating the need for a large reserve suction tank. After the speed change clutch has been fully released, the catch 148 is designed to catch and hold the speed change clutch actuating lever arm 129 in the clutch release position until the car speed is high enough to cause the link 139 to reach a point, where a trip collar 149 or equivalent means fixed at the proper point on the link, strikes the arm of catch 148, thus releasing it.

I have also provided a simple auxiliary means, for preventing the speed change clutch from being put into engagement on hills until a higher car speed is reached than would ordinarily cause it to engage on level ground. For this purpose I provide a gravity weight lever device 150, so arranged that when the car is proceeding on forward speed up a hill, the arm 151 of the lever 150 tips further toward lever arm 138 so that the latter will then have to push this weight 150 against the force of gravity before the speed change clutch suction control valve can be closed to engage this clutch, thus requiring greater force to be exerted by the centrifugal arms 129 for this purpose than on level ground, for which a higher car speed is therefore required. The greater the incline which the car ascends, the higher will be the car speed at which the speed change clutch will be engaged, obviously, because of the greater force needed by the centrifugal weights to move gravity weight 150 further against the force of gravity. To prevent undue swaying of gravity lever 150, I provide a stabilizing check means comprising a small cylinder or dashpot device 151—A having a plunger attached to the lever 150, and so arranged that air or fluid may enter the cylinder only at a regulated rate, which rate is designed to be controlled by a valve therefor. In connection with the gravity lever 150, this device may be arranged to control power means for preventing the engagement of the speed change clutch on hills at the same car speed as on level ground, instead of being used directly for this purpose. My control mechanism may be used with torque control means instead of the gravity lever, if preferred, or other means may be used, if desired, or such a device for hills may be eliminated without detracting from the merit of the invention.

To enable the operator to put the speed change clutch into engagement at any time desired regardless of the automatic control action, I have provided a positive acting suction cut out valve 152 adapted to be controlled by any suitable control connected to the rod 153 therefor. This acts to cut out the suction from being applied to the cylinder and allows atmospheric air to enter, thus allowing the speed change clutch to engage, when the control rod 153 is moved to the left far enough.

The speed change clutch automatic control mechanism illustrated in Fig. 9, as well as the type illustrated in Fig. 8, when used with transmissions having a high gear speed range and a low gear speed range as set forth in this invention, function also on the low speed range. The automatic action on this low gear range may be modified if desired by using suitable adjuncts, such as means for changing the suction valve setting on this range to compensate for the lower speed requirements. The automatic control of course does not function on the low speed range in transmissions which utilize a positive speed instead of the overrunning clutch.

The speed change clutch automatic control mechanism set forth in connection with Fig. 9, may easily be used for securing an intermediate non-shift speed change when utilized in connection with transmissions employing such intermediate speeds. For this purpose the same control mechanism may be used to control intermediate speed actuating mechanism, when the car is proceeding at such speeds as to warrant driving on intermediate speed range.

The type of automatic control set forth in connection with Fig. 9, is the preferred form, inasmuch as the more heavily weighted clutch engagement mechanism in the type illustrated in Fig. 8, is eliminated, and very light centrifugal weight control parts may be used.

Now with reference to the other illustrations, Fig. 10, illustrates modification of the gearing shown in Fig. 1, for the purpose of providing means whereby a positive forward speed reduction as well as positive reverse may be obtained. Accordingly therefore, in the mechanism illustrated in this figure, 154 designates an additional gear splined on sleeve 24 of gear member 25, so as to be free to slide axially thereon. When this gear is moved axially to the left, it is adapted to be put in mesh with gear teeth 155 formed therefor on transmission member 32—A, which corresponds to member 32 of Fig. 1. In this condition rotative power from sleeve 24 may be positively transmitted through this gear 154 and teeth 155 on member 32—A, to the propeller shaft. When gear 154 is moved axially to the right, it is in neutral position out of mesh and transmits no power. Obviously gear member 26 must be in neutral position when gear 154 is in mesh with teeth 155 in order to transmit the reduced speed. On this account special control arrangement is required for shifting the selective gears, in securing this reduced speed. This speed may be used as an auxiliary speed, such as a non-free wheeling reduced speed to be used when desired in place of the speed secured through the overrunning clutch, or it may be used instead of the two lowest speeds secured through gears 20 and 21, thus giving a three speed transmission with a positive low speed.

Fig. 11, illustrates another modification of gearing for securing a positive forward speed reduction, as well as a positive reverse drive. In the mechanism illustrated in this figure therefor, gear member 26 when moved to the right is adapted to mesh directly with teeth 156 of member 32—B, instead of with the reverse gear as in Fig. 1. Member 32—B corresponds to member 32 of Fig. 1. When this said meshing is effected, a positive reduced speed in the same forward drive direction will be imparted to the propeller shaft from sleeve 24, provided of course that gear member 6 is put in mesh with countershaft gear teeth 36, as hereinbefore set forth. When gear 26 is shifted to the left it is of course out of mesh and transmits no power unless it is shifted way over to mesh with clutch teeth 29 and 30. Reverse in this modification is secured by means of another gear 157, splined on sleeve 24, and adapted when shifted to the left, to be put into mesh with the reverse idle gear 38, which is in constant mesh with teeth 158 disposed on member 32—B. Special control arrangement is required in this case also, as gear 26 must be in neutral when gear 157 meshes with reverse gear 38.

Fig. 12, is a modified form of control means for manipulating the selective gear shift rods 42 and 44 shown in Fig. 1, by means of a single control piece. For this purpose, I utilize a control rod 159 extending through the instrument board or other convenient place and connected through suitable linkage such as lever 160 to one of the shift rods 42 or 44. Rod 159 is connected to the other of these two shift rods by a link 161 secured to one end of a bell crank lever 162, substantially as shown. Thus by an in and out manipulation of the control rod 159, the specific gear shift rod attached therewith is shifted, while an up and down manipulation of the rod 159 will accordingly shift the other of the two gear shift rods 42 and 44.

The individual improvements set forth in this invention may be used where practicable in connection with the alternative form of transmission gearing disclosed in my U. S. application for Letters Patent Ser. No. 490,010, wherein internal gears are utilized in the continuous drive speed change portion of the transmission for securing reduced speed drive thereby, instead of utilizing all external tooth gears. In such an internal gear construction however, a positive forward speed as well as positive reverse, as set forth in this present invention, may be obtained with only one countershaft shift member used. Other changes conforming to the improvements set forth in the present invention may be made also, such as moving the internal gear support bearing further to the right so that all the gears will be between bearings.

Now therefore having described my invention, I claim:

1. In a power transmission device, a speed change mechanism of the character set forth, which includes, a driving shaft therefor, gear teeth turning as one with this shaft, a gear rotatable on this shaft, intermediate gearing adapted for transmitting power from the said gear teeth to the said rotatable gear, a driven shaft element in substantial alignment with the first said shaft, a power transmitting unit having a casing element turning with the said driven shaft element and having a rotor element turning with the said driving shaft and also having a power transmitting medium between the said casing and the said rotor, the said power transmitting unit being operative so that it may be put into condition whereby the said driving shaft and the said driven shaft element will be rendered free to be turned independently of each other, a transmission member rotatable on the said driving shaft and turning with the casing of the said power transmitting unit, and overrunning clutch connective means between this said transmission member and the said rotatable gear for enabling power to be transmitted from the said rotatable gear to the said transmission member and said casing and driven shaft element connected therewith, in one rotative direction when the said power transmitting unit is put into the said condition where the said driving shaft and the said driven shaft are rendered free to turn independently of each other.

2. A claim the same as claim 1, but in which the said intermediate gearing is adapted for transmitting rotative power from the said gear teeth to the said rotatable gear, at will, and includes a transmission member shiftable at will adapted when shifted in one direction for operatively connecting the said intermediate gearing so as to put it in condition for transmitting rotative power from the said gear teeth to the said rotatable gear.

3. In a power transmission device, the combination with a speed change mechanism which includes, a driving shaft therefor, gear teeth turning as one with this shaft, a gear rotatable on this shaft, a driven shaft element in substantial alignment with the first said shaft, a friction clutch having a casing element turning with the said driven shaft element and having a rotor element turning with the said driving shaft and also having co-operative friction driving elements between the said clutch rotor and the said clutch casing, the said friction clutch being operative so that the said friction elements may be put into frictional engagement whereby the said driving shaft and the said driven shaft element may be thereby turned as one, the said friction clutch being also operative so that the said friction elements may be put out of frictional engagement whereby the said driving shaft and the said driven shaft element may be thereby rendered free to be turned independently of each other, a transmission member rotatable on the said driving shaft and turning with the casing element of the said clutch, overrunning clutch connective means between this said transmission member and the said rotatable gear for enabling power to be transmitted from the said rotatable gear to the said driven shaft element in one rotative direction when the said friction elements are put out of frictional engagement, and intermediate gearing adapted for being put into condition at will for transmitting power from the said gear teeth to the said rotatable gear, which intermediate gearing includes a slidable transmission member shiftable at will adapted when shifted in one direction for operatively connecting the said intermediate gearing so as to put it into condition for transmitting rotative power from the said gear teeth to the said rotatable gear; of gear teeth on the said transmission member which is rotatable on the said driving shaft, and a reverse idler gear adapted to mesh with these last said gear teeth, the said slidable member shiftable at will being adapted for being put into operative connection with the last said gear teeth thru means of the said idler gear when the said slidable member is shifted in the direction opposite to that in which it is shifted to put the said intermediate gearing into operative connection.

4. In a power transmission device, the combination with a speed change mechanism of the character set forth whereby speed changes may be obtained without shifting which includes, a driving shaft element, gear teeth turning therewith, a gear rotatable on this driving shaft element, intermediate gearing adapted for transmitting power from the said gear teeth to the said rotatable gear, a driven shaft element in substantial alignment with the first said shaft element, a friction clutch whose casing element turns with the said driven shaft element and whose rotor turns with the said driving shaft element, co-operative friction elements between the said clutch rotor and the said clutch casing, adapted to be put into frictional engagement, so that the said driving shaft element and the said driven shaft element may be thereby turned as one thereby, a transmission member rotatable on the said driving shaft element and turning with the casing element of the said friction clutch, and overrunning clutch connective means between this said transmission member and the said rotatable gear, for enabling power to be transmitted from the said rotatable gear to the said driven shaft element, in one direction, when the said friction clutch is released, the said overrunning clutch connective means being designed to overrun, hence transmitting no power from the said rotatable gear in this rotative direction, when the said friction clutch is engaged; of an engine driven shaft element having a hollow portion in which one end of the said driving shaft element is rotatably supported, a countershaft gear element having gear teeth turning therewith, a transmission gear member slidable on the said engine driven shaft but turning therewith and adapted for transmitting power at will to either the first mentioned shaft or to the said teeth on the countershaft gear element, gear means adapted for transmitting power at will from the countershaft gear element to the said transmission member rotatable on the driving shaft element, control means for causing the said friction clutch to be engaged and released, control means for the said transmission gear member slidable on the engine driven shaft, and control means for the last described gear means.

5. In a power transmission device, the combination with a speed change mechanism, which includes, a driving shaft element therefor, gear teeth turning as one with this shaft element, a gear rotatable on this shaft element, intermediate gearing adapted for transmitting power from the said gear teeth to the said rotatable gear, a driven shaft element in substantial alignment with the first said shaft element, a power transmitting unit having a casing element turning with the said driven shaft element and having a rotor element turning with the said driving shaft element and also having a power transmitting medium between the said casing and the said rotor, the said power transmitting unit being operative so that it may be put into condition whereby the said casing element will be thereby turned by rotation given the said rotor element, the said power transmitting unit being also operative so that it may be put into condition whereby the said casing element and the said rotor element will be thereby rendered free to be turned independently of each other, a transmission member rotatable on the said driving shaft element and turning with the said casing element of the power transmitting unit, and overrunning clutch connective means between this said transmission member and the said rotatable gear for thereby enabling power to be transmitted from the said rotatable gear to the said transmission member and the said casing and driven shaft element connected therewith, in one rotative direction when the said power transmitting unit is put into its second said condition, the said overrunning clutch being designed to overrun in this rotative direction when the said power transmitting unit is put into its first said condition; of a power driven shaft in substantial alignment with the first said shaft element, a countershaft transmission element, gear teeth turning therewith, selective gear means for transmitting power from the said power driven shaft to either the said driving shaft element or to the said teeth turning with the countershaft element, at will, and gear means adapted for transmitting power at will, from the said countershaft element to the said transmission member rotatable on the said driving shaft.

6. In a power transmission device, a speed change mechanism of the character set forth adapted for securing speed changes without shifting which includes, a driving shaft therefor, a bearing mounted in the transmission casing for maintaining the support of this driving shaft, gear teeth turning as one with this shaft, a gear rotatable on the axis of this shaft, intermediate gearing adapted for transmitting rotative power from the said gear teeth to the said rotatable gear, a driven shaft element in substantial alignment with the first said shaft, a friction clutch whose casing or housing element is adapted to turn as one with the said driven shaft element, and whose rotor is adapted to turn as one with the said driving shaft and is adapted to be disconnectably attached to this said driving shaft outside its said support bearing, friction elements turning with the said clutch casing and adapted so they may be put into frictional engagement with co-operative friction elements turning with the said clutch rotor whereby the said driving shaft and the said driven shaft may be turned as one thereby, a transmission member rotatable on the same axis as the said driving shaft and turning as one with the said clutch casing element and adapted to be disconnectably attached thereto outside the said drive shaft support bearing, and overrunning clutch connective means between this said transmission member and the said rotatable gear for enabling power to be transmitted from the said rotatable gear to the said driven shaft element in one rotative direction when the said friction elements of the said clutch are released.

7. A claim the same as claim 5 but in which the said intermediate gearing is adapted for being put into condition at will, for transmitting power from the first said gear teeth to the said rotatable gear.

8. In a power transmission device, the combination of a shaft element adapted to receive power from an engine through a clutch, a second shaft element in alignment with the first, gear teeth turning with the second said shaft element, a gear rotatably supported on the second said shaft element, gear means for transmitting power from the said gear teeth to the said rotatable gear, a third shaft element in substantial alignment with the first two, a friction clutch whose casing turns with the said third shaft element and whose rotor element turns with the second said shaft element, friction elements turning with the casing of the said friction clutch, and adapted to be put into frictional engagement with co-operative friction elements turning with the rotor element of the said friction clutch, whereby the second and third said shafts may be turned as one thereby, a transmission member rotatably mounted on the second said shaft element and turning with the casing of the friction clutch, an overrunning clutch connection between this said transmission member and the said rotatably supported gear, and adapted for transmitting power from the said rotatable gear to the said transmission member in one rotative direction, when the said friction clutch is released, and adapted to overrun, transmitting no power from the said rotatable gear in the same rotative direction, when the said friction clutch is engaged, a countershaft supported gear element, gear teeth turning therewith, a transmission member slidable on the first said shaft but turning therewith and adapted to be shifted axially for transmitting power from the first said shaft, at will, to either clutch teeth therefor turning with the second said shaft, or to the said countershaft gear element teeth, other gear teeth turning with the said transmission member rotatably mounted on the second said shaft element, a reverse idle gear in constant mesh with these last said gear teeth, a shift gear slidable on the said countershaft gear element but turning therewith and adapted to be put into and out of mesh at will with the said reverse idle gear, manually controlled means for shifting the said slidable transmission members, and automatically controlled means for putting the said friction elements of the said friction clutch into and out of frictional engagement.

9. A claim the same as claim 5, but in which the said intermediate gearing includes a slidable transmission member, shiftable at will, adapted when shifted in one direction for operatively connecting the said intermediate gearing so as to put it into condition for transmitting rotative power from the first said gear teeth to the said rotatable gear, and adapted when shifted in the opposite direction for putting the intermediate gearing out of this operative connection.

10. A claim the same as claim 5 but in which the last said gear means includes a slidable transmission member shiftable at will adapted when shifted in one direction for operatively connecting the said intermediate gearing so as to put it into condition for transmitting rotative power from the first said gear teeth to the said rotatable gear and adapted when shifted in the opposite direction for putting the said intermediate gearing out of this operative connection.

11. A claim the same as claim 5 but in which the said intermediate gearing includes a transmission member slidably splined on the said countershaft transmission element and shiftable at will, adapted when shifted in one direction for operatively connecting the said intermediate gearing so as to put it in condition for transmitting rotative power from the first said gear teeth to the said rotatable gear, and adapted when shifted in the opposite direction for putting the said intermediate gearing out of this operative connection.

12. A claim the same as claim 5 but in which the said intermediate gearing includes two gears one of which is adapted to mesh with the first said gear teeth, the other being adapted to mesh with the said rotatable gear, these said two gears being supported by the said countershaft transmission element and adapted for being put into condition at will for transmitting rotative power from the first said gear teeth to the said rotatable gear.

13. A claim the same as claim 5 but in which the last said gear means includes a slidable transmission member shiftable at will adapted when shifted in one direction for operatively connecting the said intermediate gearing so as to put it into condition for transmitting rotative power from the first said gear teeth to the said rotatable gear, and adapted when shifted in the opposite direction for putting the said intermediate gearing out of this operative connection, the said intermediate gearing including two gears one of which is adapted to mesh with the first said gear teeth, the other being adapted to mesh with the said rotatable gear, both these said two gears of the intermediate gearing being supported by the said countershaft transmission element.

14. A claim the same as claim 5 but in which the last said gear means includes a transmission member slidably splined on the said countershaft transmission element and shiftable at will, adapted when shifted in one direction for operatively connecting the said intermediate gearing so as to put it into condition for transmitting rotative power from the first said gear teeth to the said rotatable gear, and adapted when shifted in the opposite direction for putting the said intermediate gearing out of this operative connection, the said intermediate gearing including two gears one of which is adapted to mesh with the first said gear teeth, the other being adapted to mesh with the said rotatable gear, both these said two gears being supported by the said countershaft transmission element.

15. A claim the same as claim 5 but in which the said power driven shaft has a hollow portion within which one end of the driving shaft element is supported and the said selective gear means includes a member slidable on the said power driven shaft but turning therewith.

16. The combination with a speed change mechanism of the character set forth, which speed change mechanism includes, a driving shaft therefor, gear teeth turning as one with this shaft, a gear rotatable on this shaft, intermediate gearing adapted for transmitting rotative power from the said gear teeth to the said rotatable gear, a driven shaft element in substantial alignment with the first said shaft, a power transmitting unit having its housing portion turning with the said driven shaft element and having an internal rotor element turning with the said driving shaft and also having a power transmitting medium between the said housing and the said rotor, the said power transmitting unit being operative so that it may be put into condition whereby the said housing portion will be thereby turned by rotation given the said rotor element, the said power transmitting unit being also operative so that it may be put into condition whereby the said housing portion and the said rotor element will be rendered free to be turned independently of each other, a transmission member rotatable on the said driving shaft and turning with the housing of the said power transmitting unit, and overrunning clutch connective means between this said transmission member and the said rotatable gear, for enabling power to be transmitted from the said rotatable gear to the said transmission member and said housing and driven shaft element, in one rotative direction when the said power transmitting unit is put into the said condition where the said driving shaft and the said driven shaft element are rendered free to be turned independently of each other; of a power driven shaft adapted to receive rotative power from an engine thru a clutch and in alignment with the first said shaft and having a hollow portion within which one end of the first said shaft is rotatably supported, and a transmission member slidably splined on the said power driven shaft and adapted to be shifted into and out of engagement with the first said shaft at will, whereby the said power driven shaft and the first said shaft may be connected together so as to turn as one, at will.

17. The combination with a speed change mechanism of the character set forth, which speed change mechanism includes, a driving shaft therefor, gear teeth turning as one with this shaft, a gear rotatable on this shaft, a countershaft transmission element having two gears rotatably mounted thereon one of which gears meshes constantly with the first mentioned gear teeth and the other of which meshes constantly with the said gear rotatably mounted on the said driving shaft, means for clutching these said two gears to the said countershaft transmission element at will whereby rotative power may be transmitted from the first mentioned gear teeth to the said gear rotatably mounted on the said driving shaft at will, a driven shaft element in substantial alignment with the first said shaft, a power transmitting unit having its housing portion turning with the said driven shaft element and having an internal rotor element turning with the said driving shaft and also having a power transmitting medium between the said housing and the said rotor, the said unit being operative so that it may be put into condition whereby the said housing portion will be thereby turned by rotation given the said rotor element, the said unit being also operative so that it may be put into condition whereby the said housing portion and the said rotor element will be rendered free to be turned independently of each other, a transmission member rotatable on the said driving shaft and turning with the housing of the said unit, and overrunning clutch connective means between this said transmission member and the said gear rotatable on the said driving shaft, for enabling rotative power to be transmitted from the said gear rotatable on the driving shaft to the said transmission member rotatable on this shaft, in one rotative direction when the said unit is put into the said condition where the said driving shaft and the said driven shaft element are rendered free to be turned independently of each other; of a power driven shaft adapted to receive rotative power from an engine thru a clutch and in alignment with the first said shaft and having a hollow portion within which one end of the first said shaft is rotatably supported, and a transmission member slidably splined on the said power driven shaft and adapted when shifted in one direction to be put into operative connection with the first said shaft, whereby the said power driven shaft and the first said shaft may be turned together as one, the said slidably splined member being also equipped with gear teeth designed to be put into mesh with gear teeth arranged therefor on the said countershaft transmission element when the said slidably splined member is shifted in the direction opposite to that in which it is shifted to connect the first said shaft.

18. In a power transmission device, the combination with a speed change mechanism, which speed change mechanism includes, a driving shaft therefor, gear teeth turning as one with this shaft, a gear rotatable on this shaft, a driven shaft element in substantial alignment with the first said shaft, a friction clutch having a casing element turning with the said driven shaft element and having a rotor element turning with the said driving shaft and also having cooperative friction driving elements between the said clutch rotor and the said clutch casing, the said clutch being operative so that the said friction elements may be put into frictional engagement whereby the said driving shaft and the said driven shaft element may be thereby turned as one, the said friction clutch being also operative so that the said friction elements may be put out of friction driving engagement, overrunning clutch connective means between the said rotatable gear and the said clutch casing element which turns as one with the said driven shaft element for enabling power to be transmitted from the said rotatable gear to the said driven shaft element in one rotative direction when the said friction elements are put out of friction driving engagement, and intermediate gearing adapted for being put into condition at will for transmitting power from the said gear teeth to the said rotatable gear, which intermediate gearing includes a slidable transmission member shiftable at will adapted when shifted in one direction for operatively connecting the said intermediate gearing so as to put it into condition for transmitting rotative power from the said gear teeth to the said rotatable gear; of gear teeth turning as one with the said clutch casing element, and a reverse idle gear adapted to mesh with these last said gear teeth, the said slidable member shiftable at will being adapted for being put into mesh with the said idle gear when this said slidable member is shifted in the direction opposite to that in which it is shifted to put the said intermediate gearing into operative connection.

ALBERT BURDETT CLARK.